Patented Apr. 18, 1933

1,903,770

UNITED STATES PATENT OFFICE

THORVALD BERNHART AAGAARD AND BJARNE SAMDAHL, OF OSLO, AND FRANTZ PHILIP HOPSTOCK, OF KRAGERO, NORWAY, ASSIGNORS TO A/S FARMAKON, OF KRAGERO, NORWAY

PROCESS FOR PREPARATION OF A PRODUCT CONTAINING ALL OPIUM ALKALOIDS

No Drawing. Application filed April 11, 1930, Serial No. 443,608, and in Norway April 17, 1929.

This invention relates to the manufacture of morphine and the other alkaloids, sometimes referred to as bi-alkaloids, of high degree of purity, from opium. The invention is based on the observation that exceedingly pure preparations and high yields can be obtained when the liberated alkaloids of opium are dissolved in solvents and the dissolving properties of the solvents used are thereafter so much diminished by suitable added substances that the morphine is precipitated.

Analytic processes for the separation of morphine from opium are known. In these processes the alkaloid salts are first brought into an aqueous solution, whereafter organic solvents are added and the morphine is finally precipitated by a chemical reaction by the addition of ammonia.

In contrast thereto, according to the present invention, the alkaloids are first liberated from their salts by addition of an alkaline material. The liberated alkaloids after drying are dissolved in an organic solvent material after which morphine is caused to separate by a physical process, preferably by the addition of water which diminishes the dissolving capacity of the solvent for morphine.

As compared with previously known methods the new process gives purer products in excellent yield of very constant and stable composition, and further the particular characteristics of the process can be easily controlled and if necessary mutually adapted, so as to obtain a final product of constant composition.

Describing the invention more in detail, the opium is treated with a solvent for fatty materials, preferably with petroleum ether. The solution is then shaken with acidified water, preferably with water containing muriatic acid, whereupon the acid solution is separated from the solution of fatty material.

The acid solution of alkaloid may then be neutralized with an alkali, so that the alkaloid component dissolved by the fat extraction can be precipitated and separated. The acid solution containing alkaloid is preferably utilized as described in the following.

The extracted (de-fatted) opium is mixed with an alkaline substance, preferably with bicarbonate of sodium, and stirred up with the addition of an aqueous mass preferably with the acid solution obtained from the fat extraction. The mixture having an alkaline reaction is now dried completely and then pulverized.

The pulzerized product is then treated with such mixture of solvents, preferably of a halogenated hydrocarbon as chloroform or trichlorethylene and an aliphatic alcohol as methyl alcohol such that by means of a suitable addition, preferably of water, the dissolving property of the mixture in view of a desired opium component, preferably morphine, can be diminished with the result that this component precipitates and can be separated.

The alkaloids which still remain in solution in the remainder of the extraction mixture and in the wash waters, are now liberated from their solvents, transferred in solid or very concentrated and acid condition, preferably in the muriatic acid solution, whereafter substances of alkaline reaction, preferably bicarbonate of sodium, are again mixed therewith and whereby a reaction of the same nature as before occurs.

The mass after being pulverized, is subjected to any desired number of succeeding extractions with suitable solvents, preferably to one extraction with ether and then to one extraction with chloroform.

The extracted alkaloids or bi-alkaloids can then be isolated after the removal of the extraction solvents, for instance, the ether.

The chloroform extraction product is, however, preferably not vaporized, but is shaken with a dilute acid water, preferably of muriatic acid. This acid solution of alkaloids is, if necessary after cleaning, stirred with a suitable quantity of the already separated alkaloid, morphine, and then to the same is added a quantity of acid, muriatic acid, until the mixture shows a weakly Kongo-acid reaction, whereupon it is neutralized with more of the free alkaloid, morphine.

Then the isolated bi-alkaloids are dissolved in alcohol, and additional acid, preferably muriatic acid is slowly introduced into the solution until the Kongo-acid reaction occurs, whereupon the solution is neutralized with morphine.

The two alkaloid-solutions may now be mixed with another, purified and crystallized.

If the above chloroform extraction product is not treated with acid but instead is treated to isolate the alkaloids as such, all alkaloids are finally transformed into chlorides, in any suitable proportions.

The purified mixture of opium alkaloids obtained in any of the ways hereinbefore described is dried and pulverized. If necessary for the production of a product having a constant quality of morphine, an additional quantity of the separated morphine may be added.

Having thus described the invention, what is claimed as new and desired to be secured by Letters Patent is:

1. The process of separating morphine and other alkaloids from opium comprising, carefully extracting crude opium with petroleum ether, liberating the alkaloids from the extracted crude material by treating the same with an alkaline material, drying the mass containing the liberated alkaloids, dissolving the alkaloids in a mixture of solvents composed of a halogenated hydrocarbon and an aliphatic alcohol, precipitating the morphine from the solution by adding water thereto, separating the remaining alkaloids from the solution by evaporating the same to dryness, and extracting the residue with ether.

2. The process in accordance with claim 1 wherein the solvent mixture is composed of chloroform and methyl alcohol.

3. The process in accordance with claim 1 wherein the solvent mixture is composed of trichlorethylene and methyl alcohol.

In testimony whereof we have signed this 24 day of March, 1930.

THORVALD BERNHART AAGAARD.
BJARNE SAMDAHL.
FRANTZ PHILIP HOPSTOCK.